US006182129B1

(12) United States Patent
Rowe et al.

(10) Patent No.: US 6,182,129 B1
(45) Date of Patent: *Jan. 30, 2001

(54) APPARATUS, METHODS AND COMPUTER PROGRAM PRODUCTS FOR MANAGING SESSIONS WITH HOST-BASED APPLICATION USING SESSION VECTORS

(75) Inventors: Thomas Owings Rowe, Chapel Hill; Yih-Shin Tan, Raleigh, both of NC (US)

(73) Assignee: International Business Machines Corporation, Armonk, NY (US)

( * ) Notice: Under 35 U.S.C. 154(b), the term of this patent shall be extended for 0 days.

This patent is subject to a terminal disclaimer.

(21) Appl. No.: 08/927,942

(22) Filed: Sep. 11, 1997

(51) Int. Cl.[7] .............................. G06F 17/00; G06F 15/17

(52) U.S. Cl. .......................... 709/221; 709/205; 707/104

(58) Field of Search ....................................... 395/500, 610, 395/617, 701, 188.01; 709/202, 214, 205, 219, 221, 227, 224; 705/10; 379/93.35, 88.22; 370/410; 345/333, 329; 707/10, 104, 517, 513

(56) References Cited

U.S. PATENT DOCUMENTS

| 5,522,077 | * | 5/1996  | Cuthbert et al.    | 395/700    |
|-----------|---|---------|--------------------|------------|
| 5,581,753 | * | 12/1996 | Terry et al.       | 395/617    |
| 5,706,502 | * | 1/1998  | Foley et al.       | 395/610    |
| 5,754,830 | * | 5/1998  | Butts et al.       | 395/500    |
| 5,793,964 | * | 8/1998  | Rogers et al.      | 709/202    |
| 5,796,393 | * | 8/1998  | MacNaughton et al. | 345/329    |
| 5,838,682 | * | 11/1998 | Dekelbaum et al.   | 370/401    |
| 5,848,396 | * | 12/1998 | Gerace             | 705/10     |
| 5,875,296 | * | 2/1999  | Shi et al.         | 395/188.01 |
| 5,884,032 | * | 3/1999  | Bateman et al.     | 709/214    |
| 5,895,471 | * | 4/1999  | King et al.        | 707/104    |

(List continued on next page.)

OTHER PUBLICATIONS

Davis, Learn Java Now,1996.*
Allen, Online Publishing Report, www/oreilly.com/newsletters/opr/optrep.jan96.html, Jan. 1996.*
Williamson. Mainframes As High volume TP Servers For the Web. IEEE, Feb. 8, 1997.*

Primary Examiner—Mark H. Rinehart
Assistant Examiner—Thong Vu
(74) Attorney, Agent, or Firm—Myers Bigel Sibley & Sajovec; Jeanine S. Ray-Yarlettes

(57) ABSTRACT

Access to a session between a remote computer and an application resident at a host computer connected to the remote computer is provided via a link object embedded in a Web page accessible at the remote computer. A session is established between the remote computer and the application, and a link object associated with the established session is embedded in the Web page in response to establishment of the session. In response to termination of a session, the link object associated with the terminated session is removed from the Web page. According to another aspect, user selection of the link object associated with the established session is accepted at the remote computer. In response, a user interface to the established session, e.g., an input/output "screen," is provided at the remote computer. According to another aspect, a host access web page is accessed to establish a session. A Web page is accessed from the remote computer, and a Java applet downloaded to the remote computer in response to accessing of the Web page. The Java applet is then processed, either automatically or upon a user input, to establish a session between the remote computer. The Java applet may also be processed to embed a link object associated with the established session in the Web page. According to yet another aspect, a Session Vector is maintained which identifies sessions between the remote computer and the application. A link to a session identified in the Session Vector is maintained in a Web page accessible to the remote computer. In response to establishment of a session between the remote computer and the application, an identifier for the established session is added to the Session Vector. If a session limit has been achieved, establishment of a session may be prevented.

60 Claims, 11 Drawing Sheets

U.S. PATENT DOCUMENTS

| | | | |
|---|---|---|---|
| 5,896,444 | * 4/1999 | Perlman et al. | 379/93.35 |
| 5,907,704 | * 5/1999 | Gudmundson et al. | 395/701 |
| 5,913,033 | * 6/1999 | Grout | 709/219 |
| 5,915,001 | * 6/1999 | Uppaluru | 379/88.22 |
| 5,940,074 | * 8/1999 | Brtt, Jr. et al. | 345/333 |
| 5,941,945 | * 8/1999 | Aditham et al. | 709/205 |
| 5,954,798 | * 9/1999 | Shelton et al. | 709/224 |
| 5,956,736 | * 9/1999 | Hanson et al. | 707/513 |
| 5,956,737 | * 9/1999 | King et al. | 707/517 |
| 5,958,013 | * 9/1999 | King et al. | 709/227 |
| 5,964,836 | * 10/1999 | Rowe et al. | 709/221 |
| 5,968,119 | * 10/1999 | Stedman et al. | 709/219 |
| 5,991,760 | * 11/1999 | Gauvin et al. | 707/10 |
| 5,999,940 | * 12/1999 | Ranger | 707/103 |

* cited by examiner

APPARATUS, METHODS AND COMPUTER PROGRAM PRODUCTS FOR MANAGING SESSIONS WITH HOST-BASED APPLICATION USING SESSION VECTORS

FIELD OF THE INVENTION

The present invention relates to data processing apparatus (systems), methods and computer program products, more particularly, to apparatus, methods and computer program products for interfacing with host-based applications.

BACKGROUND OF THE INVENTION

The Internet is a decentralized network of computers that can communicate with one another via a transmission control protocol/internet protocol (TCIP/IP). Although the Internet has its origins in a network created by the Advanced Research Project Agency (ARPA) in the 1960's, it has only recently become a worldwide communication medium. To a large extent, the explosive growth in use of the Internet is due to the development in the early 1990's of the worldwide Web (WWW), which is one of several service facilities provided on the Internet. Other facilities include a variety of communication services such as electronic mail, telnet, usenet newsgroups, internet relay chat (IRC), a variety of information search services such as WAIS and Archie, and a variety of information retrieval services such as FTP (file transfer protocol) and Gopher.

The WWW is a client-server-based facility that includes a number of servers (computers connected to the Internet) on which Web pages or files reside, as well as clients (Web browsers) which interface the users with the Web pages. Specifically, Web browsers and software applications such as WebExplorer® (IBM Corporation) or Navigator® (Netscape Communication Corporation) send a request over the WWW to a server requesting a Web page identified by a Uniform Resource Locator (URL) which notes both the server where the Web page resides and the file or files on that server which make up the Web page. The server then sends a copy of the requested file(s) to the Web browser, which in turn displays the Web page to the user.

The Web pages on the WWW may be hyper-media documents written in a standardized language called Hyper-Text Markup Language (HTML). A typical Web page includes text together with embedded formatting commands, referred to as tags, which can be used to control font size, font style and the like. A Web browser parses the HTML script in order to display the text in accordance with the specified format.

Although many new computer applications are being developed for distributed processing environments such as the Web, there is still a large installed base of traditional computer systems having an architecture including a central host computer, typically a mainframe, and "dumb" computer terminals which are directly connected to ports of the host computer. Examples of such a configuration include IBM 3270, IBM 5250 and ASCII configurations in which a terminal communicates with a host according to a networking protocol such as TCP/IP. The networking protocol typically provides for structured grouping of data stream transmissions with a series of control characters followed by a block of displayable characters, a typical data stream comprising a plurality of sequentially transmitted control character blocks followed by displayable character blocks.

Because of the continued presence of such host-based applications, there is a need for techniques to integrate host-based content into the Web paradigm. For example, many companies have centralized information databases, services and the like, which are accessible to employees from terminals or personal computers running terminal emulation software. Many companies desire to make this content accessible to customers through the Internet or to employees through an "intranet" which has a Web-like structure and user interface.

Conventional approaches for providing such access typically use conversion/translation techniques that employ emulation software resident at an intermediate Web server. Additional code typically executes on top of the emulation software that is capable of establishing a session from the intermediate server to a host and converting emulation screen output/input into a format understood by the browser, such as HTML files, Java GUI applets, or ActiveX controls. The intermediate code typically employs a private protocol to control the exchange of data between the server and browser in the converted format.

There are several potential problems with this technique. For example, use of an intermediate server may make it difficult to navigate a host session as if it were an integral part of a browser environment. The state of the host session typically is not maintained in real time on the browser, so a user may respond to an inappropriate screen. In addition, when a Web user leaves a session to surf other Web pages and comes back, the session may be disconnected or disrupted; indeed, many conventional Web-based host access solutions restrict users from leaving a session to access other Web pages, and may force a session disconnection if a user does so. Such restriction tends to be disruptive and can limit the potential flexibility offered by a Web-based solution.

SUMMARY OF THE INVENTION

In light of the foregoing, it is an object of the present invention to provide apparatus, methods and computer program products that can provide improved management of sessions with host-based applications.

This and other objects, features and advantages are provided according to the present invention by apparatus (systems), methods and computer program products in which sessions between a remote computer and a host-based application are tracked using link objects embedded in a web page. Preferably, active sessions are identified in a Session Vector, e.g., a static or global data structure, maintained by a Session Vector Object instantiated at the remote terminal. The Session Vector provides a mechanism for linking a Web object, e.g., a field in a Web page, to a process resident at the remote computer. For example, access to a host-based session can be provided from a Web browser by linking a user-selectable HTML field to an active session.

The present invention arises from the realization that although sessions between a remote computer and a host-based application can be established and made persistent, a mechanism for accessing and managing sessions is desirable, especially for a distributed Web environment in which a user may desire to jump between host-based sessions, from a session to another Web page, and the like. The present invention provides such a mechanism in a Session Vector which holds identifiers which can be used to "find" a session at the remote computer and which is linked to link objects embedded in a host-access Web page. The Session Vector can be processed to determine which links need to be placed in the Web page, and can be referenced to find a session when a corresponding link is selected in the Web page. Without losing context in the session, a user can track sessions by referring to the Web page, and access sessions by selecting links in the Web page.

In particular, according to the present invention, access to a session between a remote computer and an application resident at a host computer connected to the remote computer is provided via a link object embedded in a Web page accessible at the remote computer. The Web page may be displayed at the remote computer, the displayed Web page including a user-selectable field, the selection of which activates the embedded link object to thereby provide access to the session.

According to one aspect of the present invention, a session is established between the remote computer and the application, and a link object associated with the established session is embedded in the Web page in response to establishment of the session. To display the link object, the Web page may be refreshed at the remote computer in response to establishment of the session. When the established session is terminated, the link object associated with the terminated session may be removed from the Web page in response to termination of the session.

According to another aspect, user selection of the link object associated with the established session is accepted at the remote computer. In response, a user interface is provided to the established session at the remote computer. For example, an input/output screen for the session associated with the user-selected link object may be displayed at the remote computer.

According to another aspect of the present invention, a host access web page is accessed to establish a session. In particular, a Web page is accessed from the remote computer, and a Java applet downloaded to the remote computer in response to accessing of the Web page. The Java applet is then processed, either automatically or upon a user input, to establish a session between the remote computer and the application. The Java applet may also be processed to embed a link object associated with the established session in the Web page.

According to yet another aspect, a Session Vector is maintained which identifies sessions between the remote computer and the application. A link to a session identified in the Session Vector is maintained in a Web page accessible to the remote computer. The Session Vector may be maintained by instantiating a Session Vector Object, which maintains the Session Vector. The Session Vector Object may be instantiated by downloading a Java applet to the remote computer from a resource location, e.g., the same Web page used to display session link objects, and processing the downloaded Java applet at the remote computer to thereby instantiate the Session Vector Object. Downloading of the applet may be initiated by accepting a user input requesting access to the Web page and loading the Web page in response to the user input.

The Session Vector may hold identifiers for sessions between the remote computer and the host-based application. In response to establishment of a session between the remote computer and the application, an identifier for the established session is added to the Session Vector. The session may be established in response to a user request to establish a session. If a session limit has been achieved, establishment of a session may be prevented.

Related systems and computer program products are also discussed. Improved management of host-based sessions in a Web environment may thereby be provided.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION OF PREFERRED EMBODIMENTS

Figure 1:
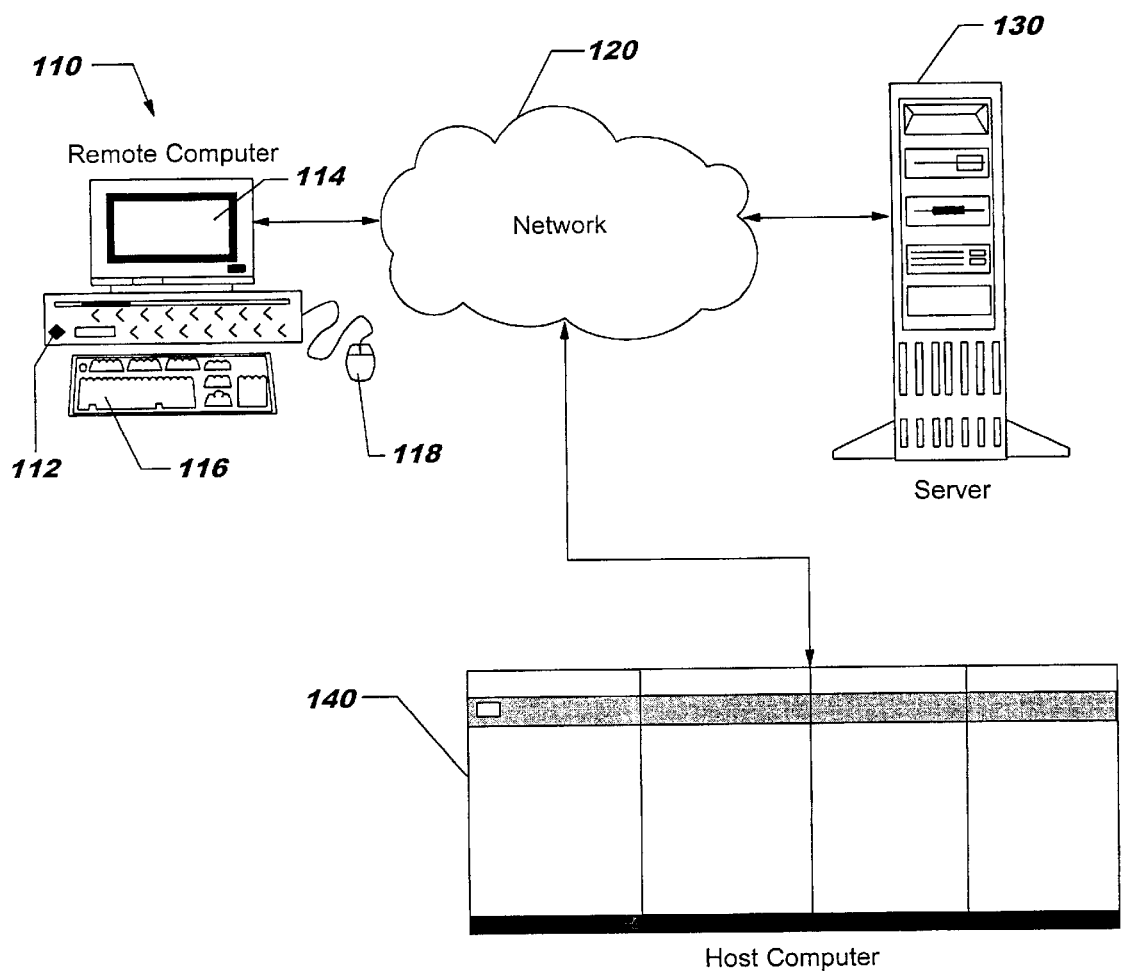
FIGS. 1 and 2 are schematic block diagrams illustrating system in which the methods and apparatus of the present invention may be embodied.

The present invention now will be described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

In the discussion that follows, reference is made to "application." For purposes of the discussion here, "application" refers to terminal-type host-based applications. These applications include, but are not limited to, such mainframe applications as 3270 and 5250 applications which use screen-type user interfaces to display and receive data from a user at a terminal connected to the mainframe computer.

The description herein also refers to "objects," i.e., processing structures created according to object-oriented programming principles. Those skilled in the art will appreciate that, in general, objects are programming models which generally are defined by "state" and "behavior." In the programming implementation of an object, the state of an object is defined by its fields, which may or may not be accessible from outside of the object. An object's behavior is defined by its methods, which manipulate instance variables (data for the object) to create new state, and which also can create new objects. Typically, the object's methods are the only means by which other objects can access or alter its instance variables, with objects interacting with one another via messages. Object-oriented programming techniques are utilized in many modern programming languages, including C++ and Java.

Those skilled in the art will appreciate that although the description herein makes use of object-oriented programming concepts, the present invention may be embodied using other techniques which may not be considered "object oriented." For example, the present invention may be implemented using more a traditional procedural framework that, in effect, embodies functionality also attainable using object-oriented principles. Accordingly, those skilled in the art will appreciate that the present invention is applicable to object-oriented and non-object-oriented environments.

To provide an example of an object-oriented environment in which the systems, methods and computer program products of the present invention may be embodied, the discussion herein describes a Java environment. Java is an object-oriented programming language developed by Sun Microsystems, Mountain View, Calif. Java is designed to be portable and architecturally neutral, making it advantageous for distributed processing applications in which computers having a variety of different operating systems are interconnected. Java source code is compiled into a machine-independent format that can be run on any platform with a Java runtime system known as the Java Virtual Machine (JVM). The JVM is a process that emulates a virtual processor through the use of software on a real machine, allowing Java software to execute under diverse operating systems, including UNIX, Windows NT, and MacIntosh.

Web browsers including Netscape Navigator® and Microsoft Internet Explorer® are referred to as Java-enabled browsers because they include a version of the JVM. Java applets are programs written in Java and configured to run within Java-enabled browsers. Handled in a manner similar to the way images are handled, Java applets may be displayed as part of a HyperText Mark Up Language (HTML) document. When an applet is loaded, it can present special effects, such as animation, graphics, and sound, perform real-time data updates and applications, and can interact with a user through a mouse, keyboard and various interface elements such as buttons, slides and text fields.

Java source code is compiled into bytecode using a Java compiler referred to as a Javac. Compiled Java programs are saved in files with the extension ".class". When a Java-enabled Web browser recognizes that an applet has been requested, a Java interpreter processes the applet bytecode on the JVM. The Java programming language and environment is extensively described in "The Java Tutorial: Object-Oriented Programming for the Internet," by Mary Campione and Kathy Walrath, published by Addison-Wesley Pub Co (1996).

A related United States Patent Application entitled "Systems, Methods and Computer Program Products for Conducting a Session with a Host-Based Application," assigned to the assignee of the present application, filed concurrently herewith and herein incorporated by reference in its entirety, describes a Host On-Demand process in which terminal emulation information, e.g., a Java applet, is loaded at a remote computer from a host access resource location, e.g., a Web page, in a network including the remote computer. The terminal emulation information is processed at the remote computer to conduct a persistent session between the remote computer and a host-based application, i.e., a session which persists when the remote computer accesses another resource location (or reloads the host access resource location). In this manner, a platform-independent solution is provided which does not required a mediating server in the session and which allows a user to navigate among resource locations without requiring termination of the session.

According to the present invention, links to host-based sessions are embedded in a Web page, preferably the same Web page accessed to download the terminal emulation information for conducting such host-based sessions. An embedded link provides access to a session between a remote computer and a host-based application. According to a preferred embodiment of the present invention, sessions may be tracked in a Session Vector maintained by a Session Vector Object that is instantiated at the remote computer, preferably upon access to the same Web page that is accessed to download the terminal emulation information. Those skilled in the art will understand that in a general sense, a Session Vector may be a static or global data structure or similar construct that provides for the identification of processes running on the remote computer. For example, a Session Vector may be an object variable or similar data structure which stores an identifier in the remote computer's memory which may be used to access a task list for the operating system of the remote computer.

FIG. 1 illustrates a computer system in which the methods and apparatus of the present invention may be embodied. A network 120 includes a remote computer 110, for example, a personal computer including such components as a central processing unit (CPU) 112, a display 114 and user input devices such as a keyboard 116 and a mouse 118. The remote computer 110 is connected to a server 130 of the network 120, as well as to a host application at a host computer 140. Those skilled in the art will appreciate that the remote computer 110 may take other forms than the personal computer illustrated; for example, the remote computer 110 may include a so-called "network computer," i.e., a Web-enabled terminal with little or no local disk storage, or other computing device such as a personal digital assistant (PDA), personal communications system (PCS), or the like. Those skilled in the art will also appreciate that the server 130 make take various forms, including conventional PC-type servers or similar devices which may be addressable as locations in a network and have the capability to store information. Although host computer 140 will typically take the form of a traditional mainframe computer running a conventional terminal application such as a 3270 application, those skilled in the art will appreciate that the host computer 140 may comprise various other apparatus that run applications that conduct input the output according to a terminal-type interface.

Figure 2:
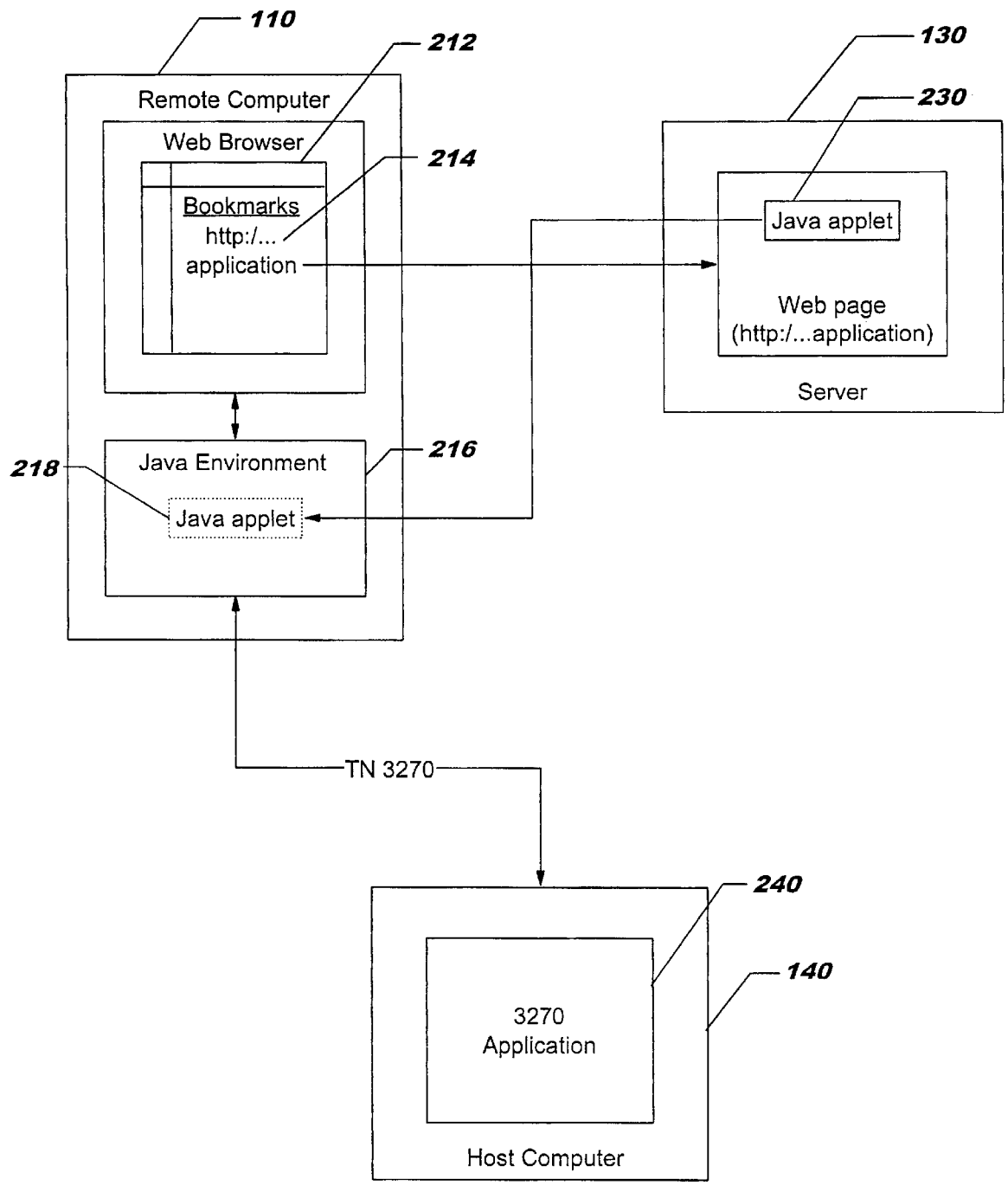

FIG. 2 provides an illustration of a system for managing sessions between and remote computer 110 and an application resident on a host computer 140, here shown as a 3270 application 240. The remote computer 110 may be configured to produce a platform-independent common environment, for example, a Java environment 216 (or, in Java nomenclature, a Java Virtual Machine). A Java applet 232 is stored on a server 130 at a resource location, for example, a Web page 230. The Java applet 232 may be downloaded to the remote computer 110 to be processed under the Java environment 216 to establish a session between the remote computer 110 and the application 240 on the host computer 140. For example, processing of the downloaded Java applet 218 may cause the remote computer to establish a user interface for the application, as well as control communications between the remote computer 110 and the application 240 according to the protocol required by the application 240, e.g., a TN3270 protocol. Those skilled in the art will appreciate that although FIG. 2 illustrates a direct connection between the remote computer 110 and the host computer 140, communications therebetween may occur through one or more intermediate devices. For example, a Java security framework may require connection of the remote computer 110 and the host computer 140 through a server.

Although the embodiment illustrated in FIG. 2 involves downloading of an applet from a server 130 which is part of a network that includes the remote computer 110, the present invention can also be implemented by loading terminal emulation information at the remote computer 110 in other ways. For example, the terminal emulation information may comprise a Java applet that is stored at a local resource location at the remote computer 110, e.g., on a hard drive, diskette, CD-ROM, or similar storage medium. The locally stored terminal emulation information may loaded directly at the remote computer 110 without requiring a network transfer and used to conduct a session between the remote computer 110 and the host application 240.

Figure 3:
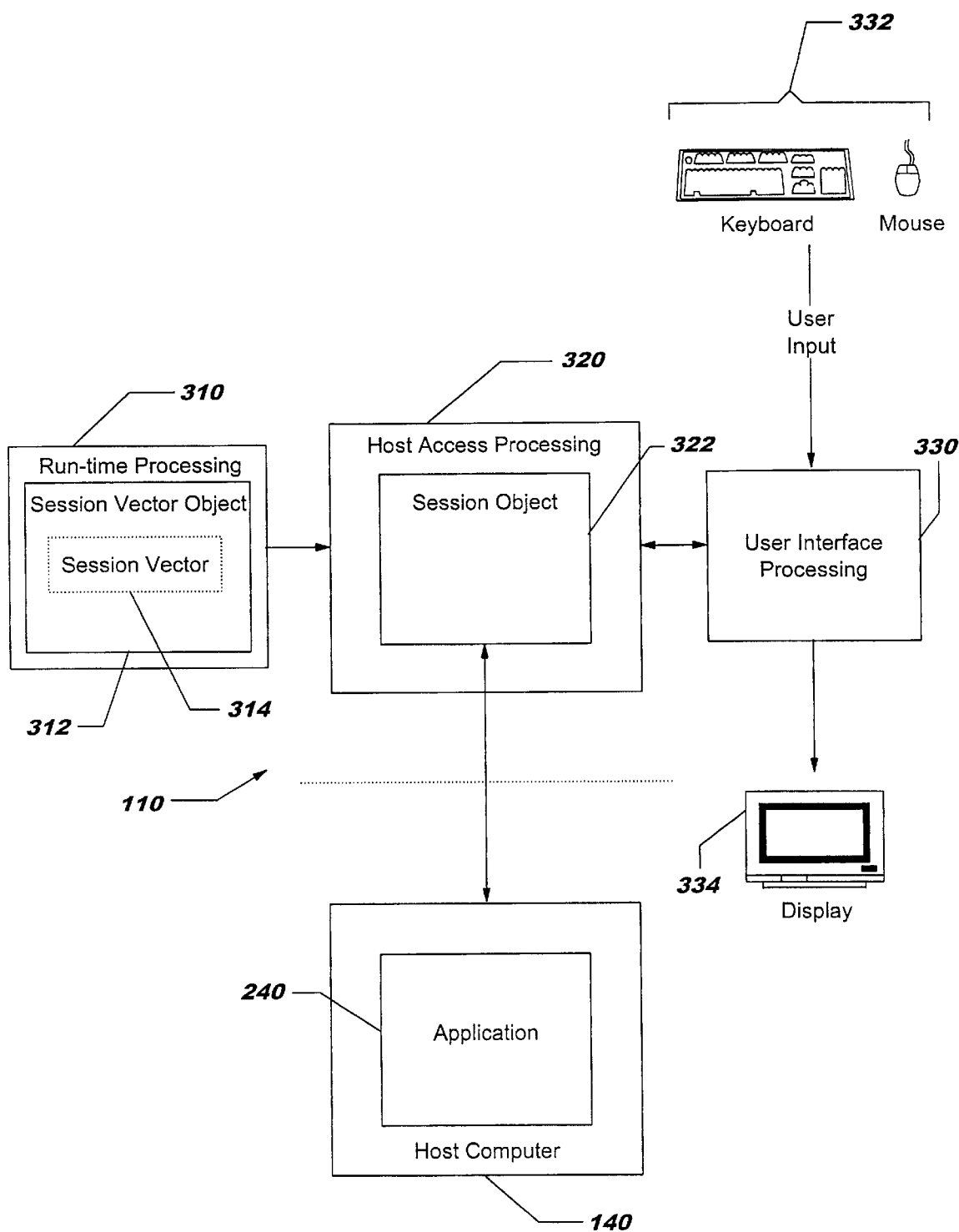
FIG. 3 is a schematic block diagram of a system for managing host-based sessions according to the present invention.

FIG. 3 illustrates an exemplary embodiment according to the present invention, in particular, an object structure for managing sessions. Host access processing 320 includes a Session Object 322 that conducts a session between a remote computer 110 and an application 240 on a host computer 140. Run-time processing 310 includes a Session Vector Object 312 that maintains a Session Vector 314 for identifying sessions between a remote computer 110 and an application 240 resident on a host computer 140. For example, the Session Vector 314 may include a "handle," i.e., an identifier, for the Session Object 322 which allows the remote computer 110 to access the associated session with the application 240 via, for instance, a user interface established by user interface processing 330. For example, the user interface processing 330 may provide a display 334 for displaying, for example, a terminal-type input/output screen, and means for accepting user inputs from input devices 332 such as a keyboard or mouse.

Operations according to various aspects of the present invention are illustrated in the flowchart illustrations of FIGS. 4–9. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the flowchart block or blocks.

The computer program instructions may also be executed by a processor or other programmable data processing apparatus to cause a series of operational steps to be performed by the processor or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Figure 4:
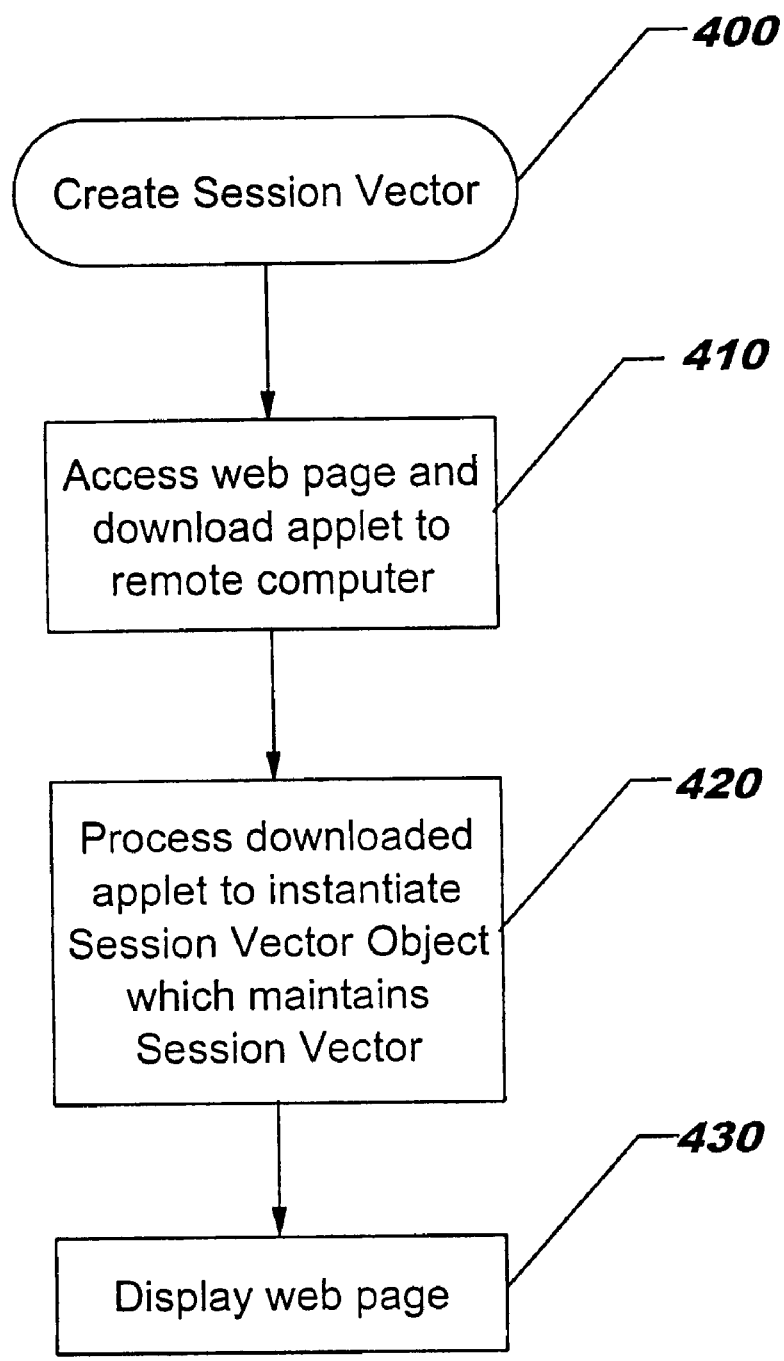
FIGS. 4–9 are flowchart illustrations of operations for managing host-based sessions according to the present invention.

FIG. 4 illustrates operations for creating a Session Vector according to an embodiment of the present invention (Block 400). A Web page containing an applet is downloaded to a remote computer from, for example, a server connected to the remote computer (Block 410). The downloaded applet is processed to instantiate a Session Vector Object which maintains a Session Vector for identifying sessions between the remote computer and an application resident on a host computer connected to the remote computer (Block 420). The accessed Web page is displayed at the remote computer (Block 430).

As known to those skilled in the art, a remote computer may access a Web page by establishing TCP/IP communications with a server hosting the Web page, more specifically, with a resource location identified by a Uniform Resource Locator (URL). Typically, the server is a personal computer, mainframe computer, minicomputer, or similar data processing device having a data processor and data storage capability, and data transferred between the remote computer and the server are processed according to the HyperText Transfer Protocol (HTTP). To access a Web page hosted at a server, a remote computer, via a Web browser or similar interface, sends a TCP/IP message to the server that represents a request for the Web page. Data for the Web page are transferred to the remote computer, and the Web page is generated on the display of the remote computer from the transferred objects. Accordingly, for purposes of the discussion herein, "Web page" may refer to both the resource location (URL) used to access a Web page, and the actual physical display of the Web page at a computer accessing the Web page.

As known to those of skill in the art, a Java applet may be embedded in a hypertext markup language (HTML) document via an "applet tag." This tag is used to describe the applet, its parameters, and its dimensions. When an applet tag is activated, the Web browser accessing the HTML document downloads code for the applet from a specified server, and executes the code on the computer at which the browser is operating. As will be appreciated by those skilled in the art, applet activation can be automatic, e.g., upon access to the HTML document, or may be activated by a user action such as selection of a button or similar object in the displayed document. Accordingly, instantiation of a Session Vector Object as described above may occur upon access to a Web page having an applet tag embedded therein, or may be initiated by selection of an item on such a page. An extensive description of HTML is provided by the "HTML Reference Manual," published by Sandia National Laboratories (1996), available on the World Wide Web at http://www.sandia.gov/sci_compute/html_ref.html.

Figure 5:
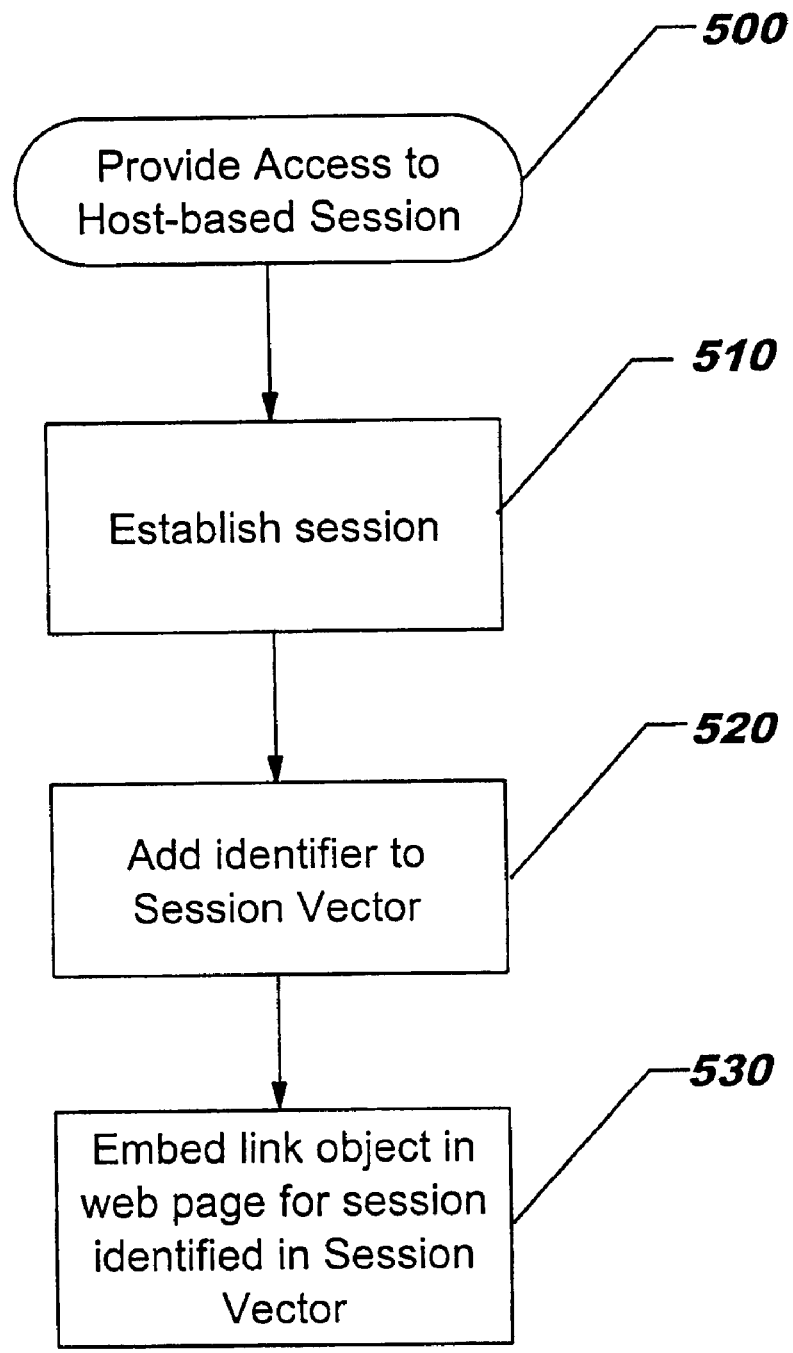

According to an aspect of the present invention illustrated in FIG. 5, operations for providing access to a host-based session (Block 500) include establishing a session between the remote computer and the host-based application (Block 510). An identifier for the established session is added to the Session Vector (Block 520). A link object for the established session is then embedded in the Web page to provide access to the established session (Block 530).

Figure 6:
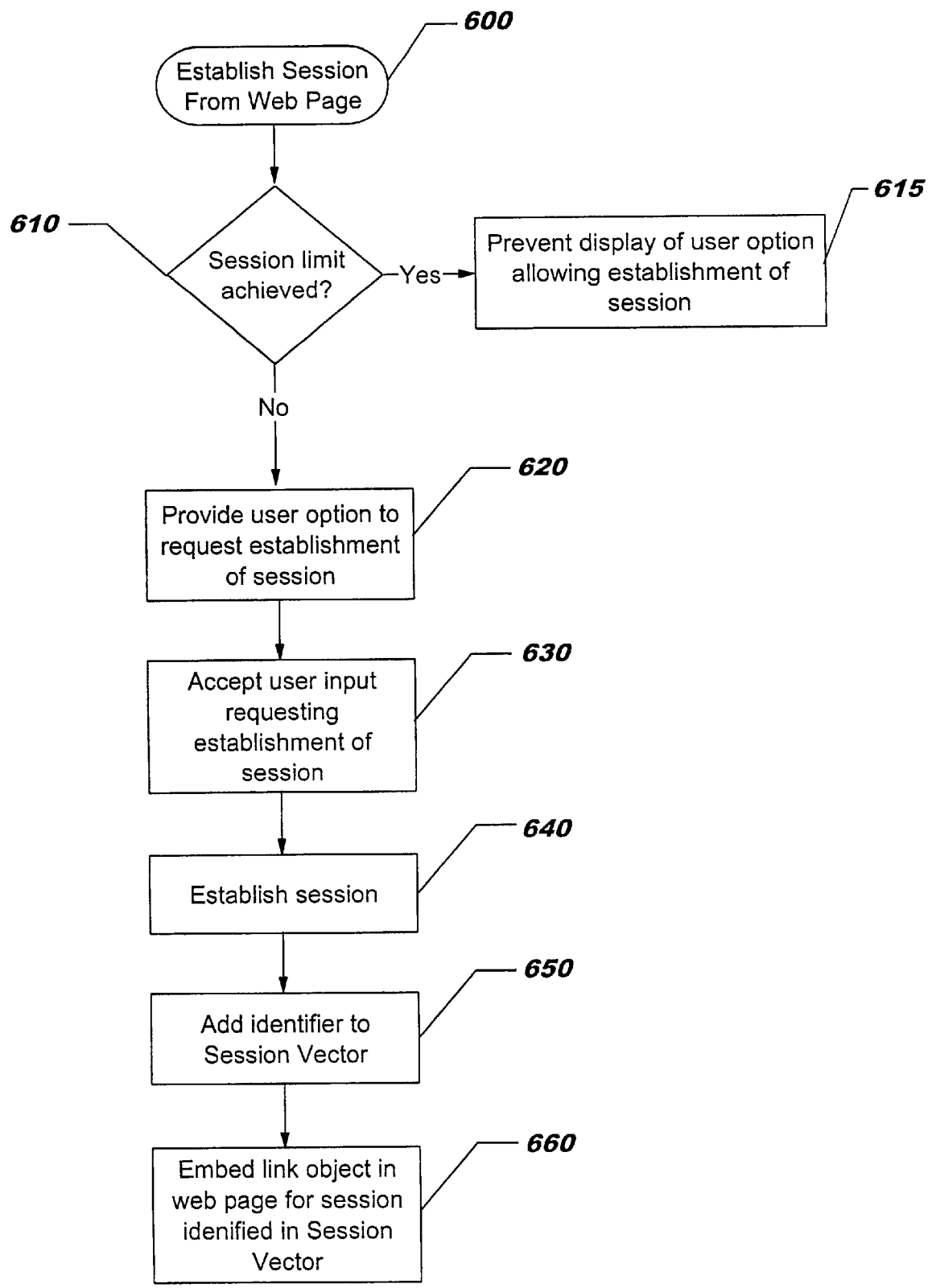

According to another aspect of the present invention illustrated in FIG. 6 (Block 600), a session may be established from the Web page by selecting a user option provided by the Web page, for example, a button displayed in the Web page. The provision of the user object may be subject to whether or not a session limit, e.g., a maximum number of sessions between the remote computer and the host-based application, has been achieved. If the session limit has been achieved (Block 610), establishment of a session is prevented, for example, by a not displaying a user option to request establishment of a session from the Web page (Block 615), e.g., by removing the button from the Web page. If the session limit has not been reached, however, the user option is provided (Block 620). A user input requesting establishment may then be accepted (Block 630), and a session may be established in response (Block 640). An identifier for the established session is then added to the Session Vector (Block 650), and an associated link object is embedded in the Web page for the identified session (Block 660).

Figure 7:
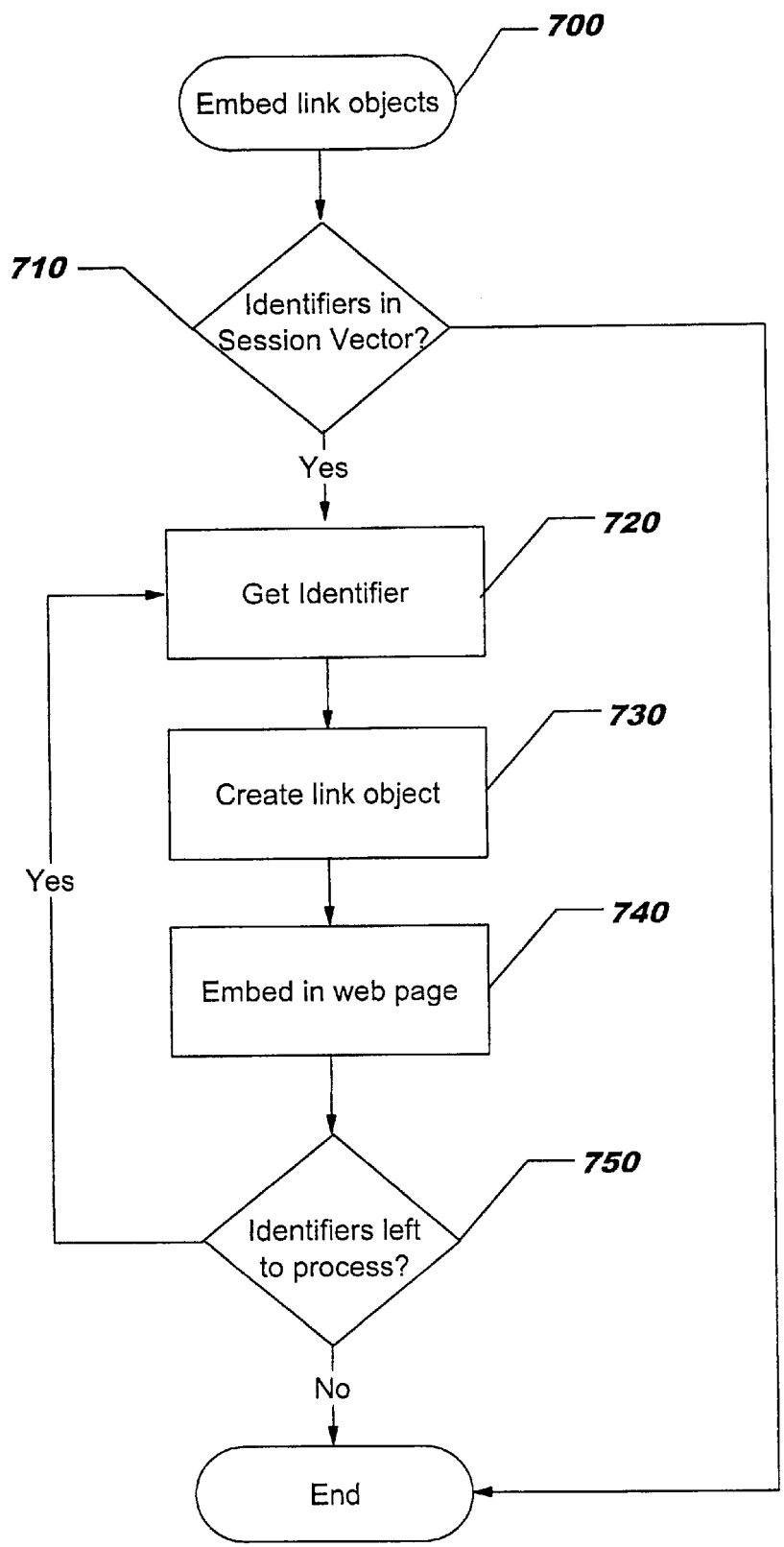

FIG. 7 illustrates operations for using the Session Vector to embed appropriate link objects in the Web page (Block 700). Upon reloading of the Web page, if the Session Vector is not empty (Block 710), a first session identifier is retrieved (Block 720) and processed by creating an associated link object (Block 730) and embedding the link object into the Web page (Block 740). If additional session identifiers remain in the Session Vector (Block 750), they are similarly retrieved and processed to produce associated embedded link objects in the Web page (Blocks 720–740). If no session identifiers remain to be processed, the Web page may be displayed at the remote computer to provide access to the active session(s), e.g., by displaying the Web page with links which may be selected by the user to access the associated sessions. As new sessions are created, associated link objects may be added to the Web page.

Figure 8:
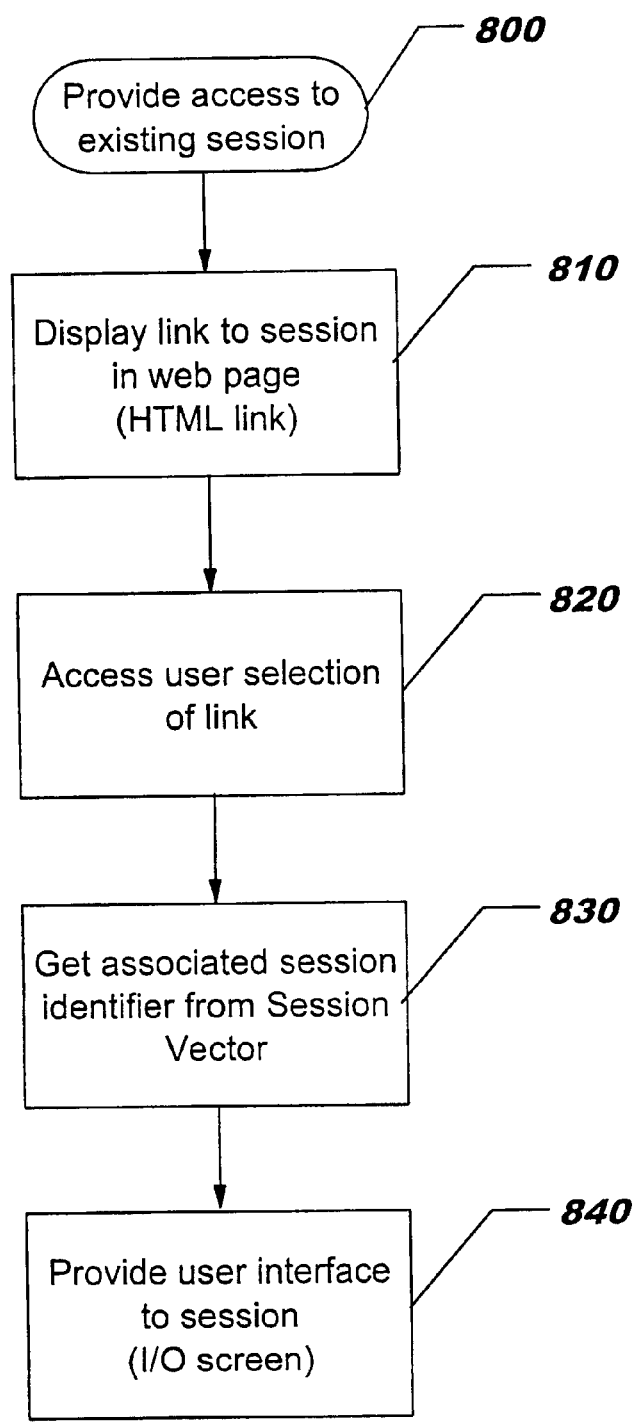

Access to an established session may be provided from the Web page according to another aspect of the present invention illustrated in FIG. 8 (Block 800). A link object is embedded in the Web page, e.g., a link is displayed in the Web page at the remote computer (Block 810). User selection of the link is accepted (Block 820), and the associated identifier retrieved from the Session Vector (Block 830). Based on the identifier, a user interface is provided to the selected session (Block 840). For example, a link may be provided in a Web page displayed at the remote computer, and selection of the link by the user may initiate establishment of a user interface (a screen) to the session. For example, a screen may be provided in the current Web browser window, or a new window may be opened to display the screen.

A link object may be embedded in the Web page by displaying, for example, an image icon or field and associated session identifier or name on the display of the Web page and implementing a mouse event handler. The session identifier may be retrieved from the Session Vector and stored in the link object. The image icon or field may be a predefined graphic image object, such as a Graphic Interchange Format (GIF) file. Access to a session may occur, for example, when a user "clicks" on the image icon associated with the session, causing the mouse event handler to take control. The event handler uses the session identifier to locate the corresponding Session Object and request focus for the session.

Figure 9:
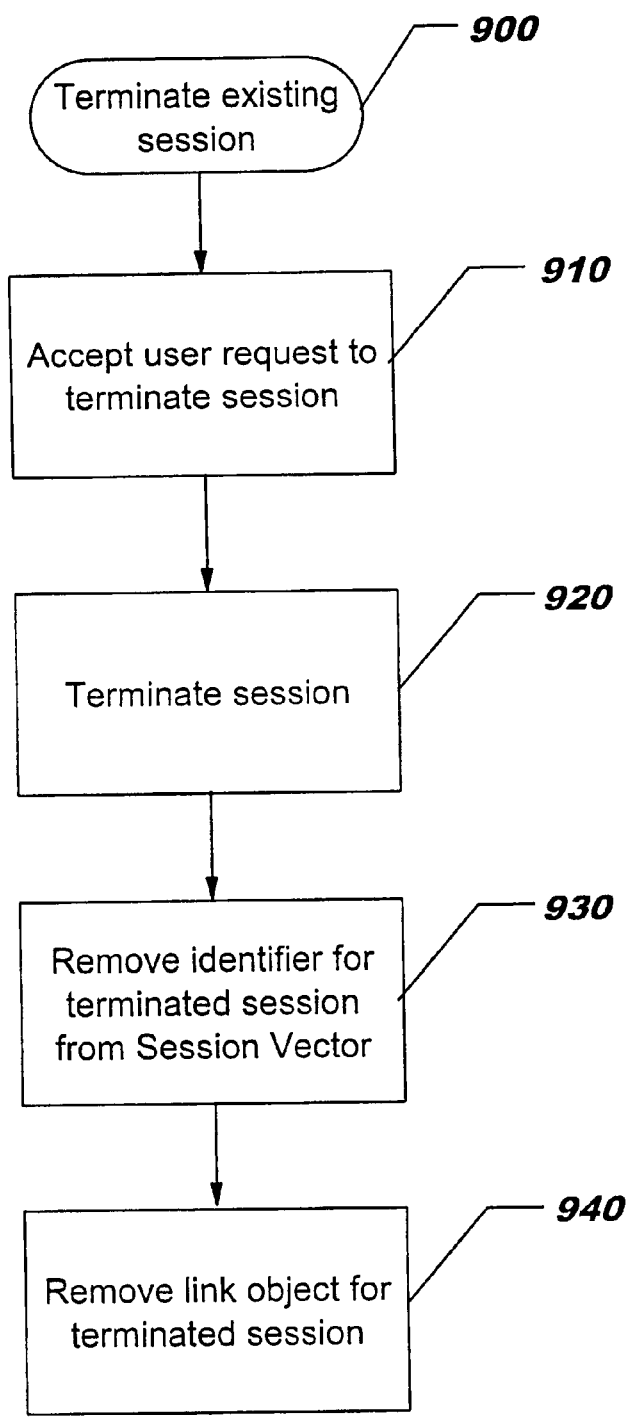

Operations for terminating a session according to the present invention are illustrated in FIG. 9 (Block 900). A user request to terminate a session is accepted (Block 910). In response, the session is terminated (Block 920), and the associated identifier is removed from the Session Vector (Block 930). The associated link object is also removed from the Web page (Block 940). For example, the link object for the terminated session may be removed by refreshing the Web page; because the identifier for the terminated session will no longer be present in the Session Vector, it can be prevented from being renewed in the refreshed page.

Figure 10:
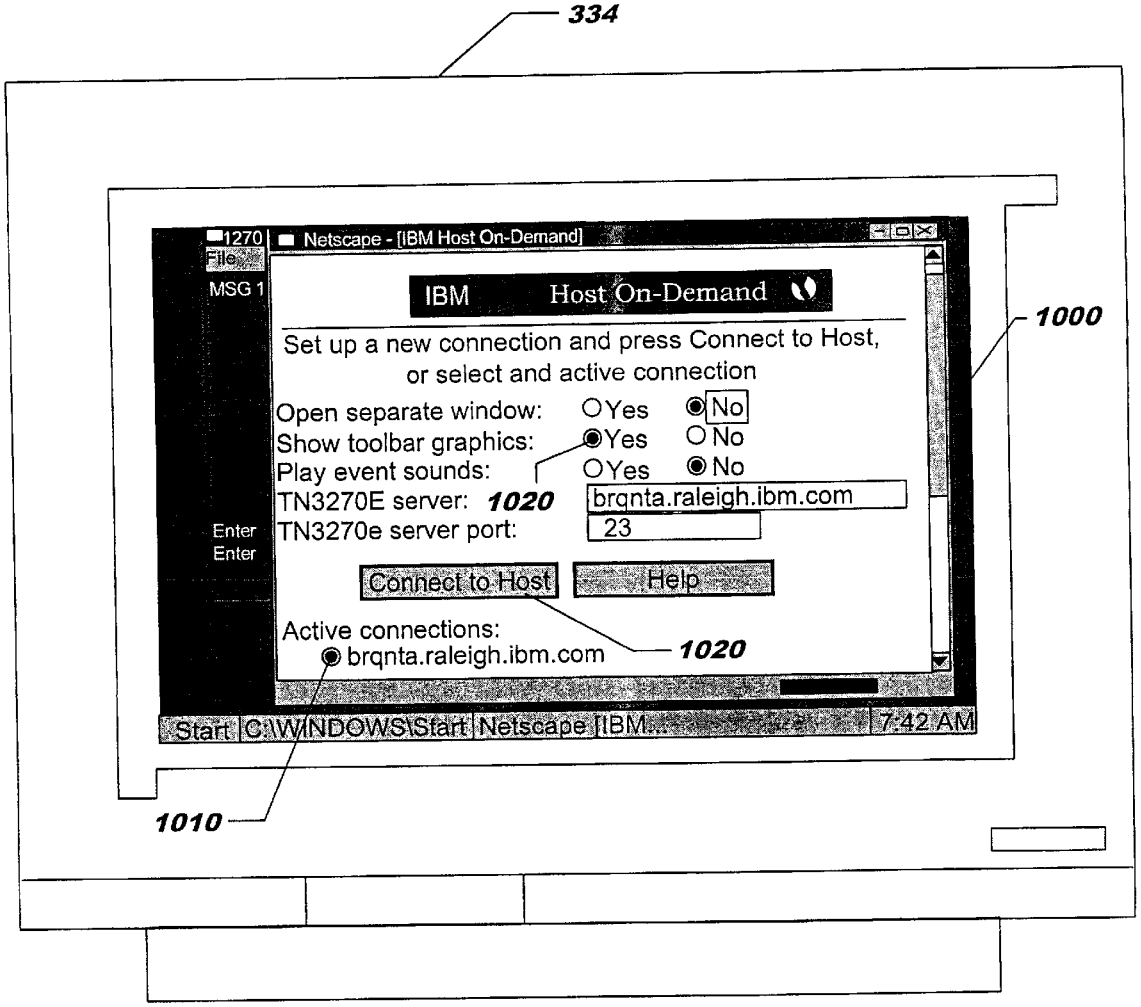
FIGS. 10–11 illustrate exemplary user interfaces for managing host-based applications according to the present invention.
Figure 11:
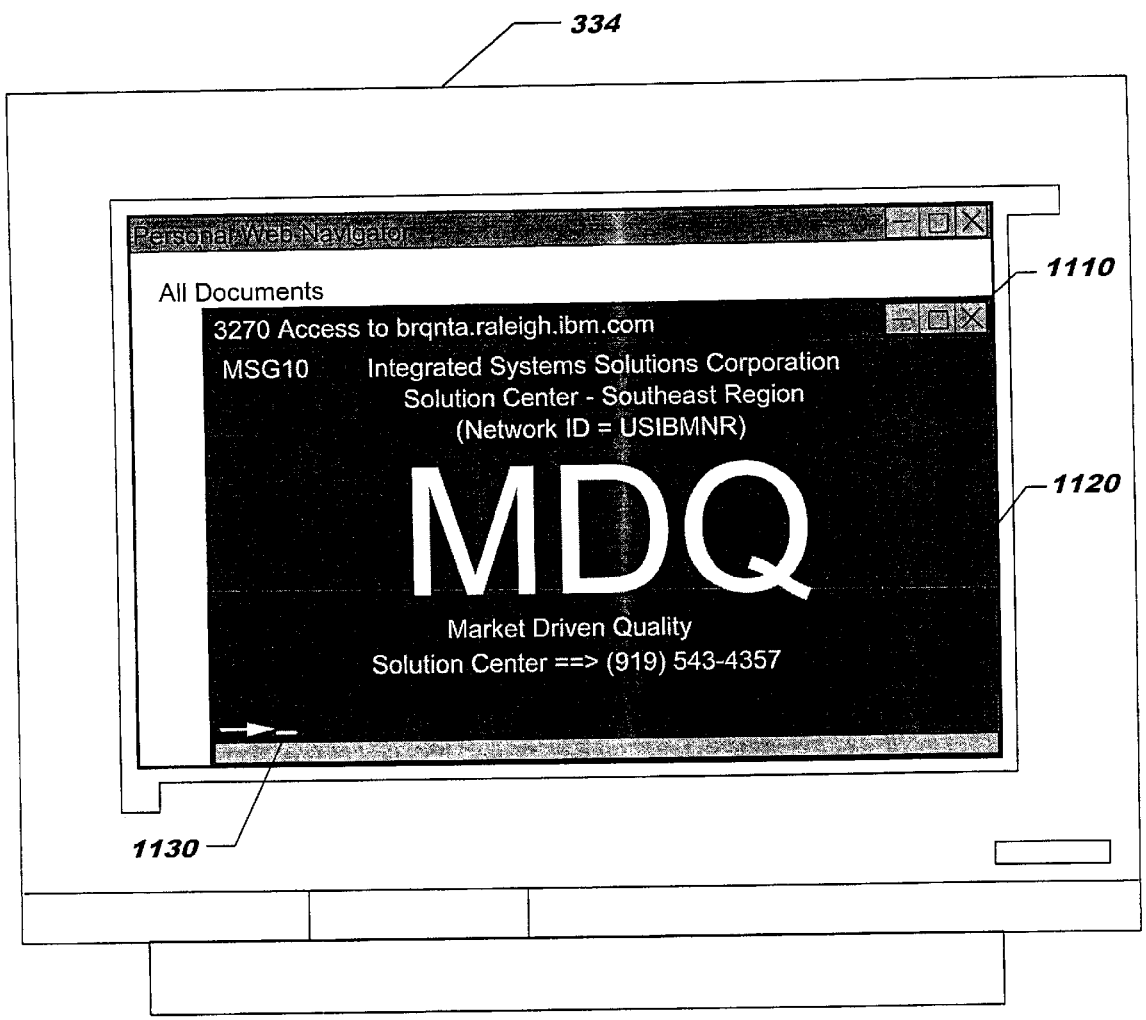

FIG. 10 illustrates an exemplary Web page 1000 according to the present invention. The Web page 1000 has a user-selectable link objects 1010 embedded therein for accessing an associated session in the Session Vector, as well as user options 1020 for configuring and establishing new sessions. Upon selection of a user option to create a new session, a new session is established between the remote computer and the host-based application and a new link object 1010 is embedded in the Web page 1000. Upon selection of a link object 1010, access to the associated session is provided, for example, by a user interface as illustrated in FIG. 11. In particular, FIG. 11 illustrates a user interface comprising a window 1110 having a screen 1120 displayed therein. As will be understood by those skilled in the art, the screen 1120 may display various input/output fields for communicating information with the application, such as an input prompt 1130 (displayed in the lower left corner of the screen).

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A method of managing a session between a remote computer and an application resident at a host computer connected to the remote computer, the method comprising the step of:
   providing access to a session between the remote computer and the application via a link object embedded in a Web page accessible at the remote computer, wherein the session between the remote computer and the application is identified by a Session Vector.

2. A method according to claim 1, wherein said step of providing access comprises the step of displaying the Web page at the remote computer, the displayed Web page including a user-selectable field, the selection of which activates the embedded link object to thereby provide access to the session.

3. A method according to claim 1, wherein said step of providing access is preceded by the step of establishing a session between the remote computer and the application, and wherein said step of providing access comprises the step of embedding a link object associated with the established session in the Web page in response to establishment of the session.

4. A method according to claim 3, further comprising the step of reloading the Web page at the remote computer in response to establishment of the session.

5. A method according to claim 3, wherein said step of embedding a link object is followed by the steps of:
   terminating the established session; and
   removing the link object associated with the terminated session from the Web page in response to termination of the session.

6. A method according to claim 5, further comprising the step of reloading the Web page at the remote computer in response to termination of the session.

7. A method according to claim 3, further comprising the steps of:
   accepting user selection of the link object associated with the established session at the remote computer; and
   providing a user interface to the established session at the remote computer in response to user selection of the link object associated with the established session.

8. A method according to claim 7, wherein said step of providing a user interface comprises the step of displaying an input/output screen for the session associated with the user-selected link object.

9. A method according to claim 1:
   wherein said step of providing access is preceded by the steps of:
      accessing the Web page from the remote computer;
      downloading a Java applet to the remote computer in response to accessing of the Web page; and
      processing the Java applet at the remote computer to establish a session between the remote computer; and
   wherein said step of providing access comprises the step of processing the Java applet at the remote computer to embed a link object associated with the established session in the Web page.

10. A method of managing a session between a remote computer and an application resident on a host computer operatively associated with the remote computer, the method comprising the steps of:
   maintaining a Session Vector which identifies sessions between the remote computer and the application; and
   maintaining a link to a session identified in the Session Vector in a Web page accessible to the remote computer.

11. A method according to claim 10, wherein said step of maintaining a Session Vector comprises the step of instantiating a Session Vector Object which maintains the Session Vector.

12. A method according to claim 11, wherein said step of instantiating comprises the steps of:
   downloading a Java applet to the remote computer from a resource location operatively associated with the remote computer; and
   processing the downloaded Java applet at the remote computer to thereby instantiate the Session Vector Object.

13. A method according to claim 12, wherein the resource location comprises the Web page.

14. A method according to claim 13, wherein said step of downloading is preceded by the steps of:
   accepting a user input requesting access to the Web page; and
   loading the Web page in response to the user input.

15. A method according to claim 11, wherein the Session Vector is configured to maintain identifiers for sessions, and further comprising the steps of:
   establishing a session between the remote computer and the application; and
   adding an identifier for the established session to the Session Vector.

16. A method according to claim 15:
   wherein said step of establishing is preceded by the step of accepting a user request to establish a session at the remote computer; and
   wherein said step of establishing comprises the step of establishing a session in response to the accepted user request.

17. A method according to claim 16, wherein said step of maintaining a Session Vector comprises the step of determining if a session limit has been achieved, and further comprising the step of preventing establishment of a session if the session limit has been achieved.

18. A method according to claim 15, wherein said step of maintaining a link comprises the step of creating a link to the established session in a Web page.

19. A method according to claim 18, wherein said step of maintaining a link comprises the step of updating the Web page in response to addition of the identifier to the Session Vector.

20. A method according to claim 18, wherein said step of creating a link to the established session is followed by the steps of:
   accepting a user selection of the link to the established session; and
   providing a user interface to the session associated with the selected link.

21. A method according to claim 20, wherein said step of providing a user interface comprises the step of displaying an input/output screen for the session associated with the selected link at the remote computer.

22. A method according to claim 18, further comprising the steps of:
   terminating the session between the remote computer and the application; and
   removing the identifier for the terminated session from the Session Vector.

23. A method according to claim 22 wherein said step of removing is followed by the step of removing the link to the terminated session from the Web page.

24. A system for managing a session between a remote computer and an application resident at a host computer connected to the remote computer, the system comprising:
   a Web page, accessible to the remote computer, which includes a link object embedded therein which provides access to a session between the remote computer and the application, wherein the session between the remote computer and the application is identified by a Session Vector.

25. A system according to claim 24, further comprising means for displaying the Web page at the remote computer, the displayed Web page including a user-selectable field, the selection of which activates the embedded link object to thereby provide access to the session.

26. A system according to claim 24, further comprising means for establishing a session between the remote computer and the application, and means for embedding a link object associated with the established session in the Web page in response to establishment of the session.

27. A system according to claim 26, further comprising means for reloading the Web page at the remote computer in response to establishment of the session.

28. A system according to claim 26, further comprising:
   means for terminating the established session; and
   means, responsive to said means for terminating, for removing the link object associated with the terminated session from the Web page in response to termination of the session.

29. A system according to claim 28, further comprising means, responsive to said means for terminating, for reloading the Web page at the remote computer in response to termination of the session.

30. A system according to claim 26, further comprising:
   means, responsive to a user at the remote computer, for accepting user selection of the link object associated with the established session at the remote computer; and
   means, responsive to said means for accepting user selection of the link object, for providing a user interface to the established session at the remote computer in response to user selection of the link object associated with the established session.

31. A system according to claim 30, wherein said means for providing a user interface comprises means for displaying an input/output screen for the session associated with the user-selected link object.

32. A system according to claim 24, further comprising:
   means for accessing the Web page from the remote computer;
   means, responsive to said means for accessing, for downloading a Java applet to the remote computer in response to accessing of the Web page;
   means, responsive to said means for downloading, for processing the Java applet at the remote computer to establish a session between the remote computer; and means, responsive to said means for processing the Java applet at the remote computer to establish a session, for processing the Java applet at the remote computer to embed a link object associated with the established session in the Web page.

33. A system for managing sessions between a remote computer and an application resident on a host computer operatively associated with the remote computer, the system comprising:

means for maintaining a Session Vector which is configured to identify sessions between the remote computer and the application; and means, responsive to said means for maintaining a Session Vector, for maintaining a link to a session identified in the Session Vector in a Web page accessible to the remote computer.

34. A system according to claim 33, wherein said means for maintaining a Session Vector comprises means for instantiating a Session Vector Object which maintains the Session Vector.

35. A system according to claim 34, wherein said means for instantiating comprises:

means for downloading a Java applet to the remote computer from a resource location at server operatively associated with the remote computer;

means, responsive to said means for downloading, for processing the downloaded Java applet at the remote computer to thereby instantiate the Session Vector Object.

36. A system according to claim 35, wherein the resource location comprises the Web page.

37. A system according to claim 36, further comprising:

means, responsive to a user at the remote computer, for accepting a user input requesting access to the Web page; and means, responsive to said means for accepting a user input, for loading the Web page in response to the user input.

38. A system according to claim 34, wherein the Session Vector is configured to maintain identifiers for sessions, further comprising means for establishing a session between the remote computer and the application, and wherein said means for maintaining a Session Vector comprises means for adding an identifier for the established session to the Session Vector.

39. A system according to claim 38, further comprising means for accepting a user request to establish a session at the remote computer, and wherein said means for establishing comprises means for establishing a session in response to the accepted user request.

40. A system according to claim 39, wherein said means for maintaining a Session Vector comprises means for determining if a session limit has been achieved, and further comprising means, responsive to said means for determining if a session limit has been achieved, for preventing establishment of a session if the session limit has been achieved.

41. A system according to claim 38, wherein said means for maintaining a link comprises means for creating a link to the established session in the Web page.

42. A system according to claim 41, wherein said means for maintaining a link comprises means for updating the Web page in response to addition of the identifier to the Session Vector.

43. A system according to claim 41, further comprising:

means, responsive to a user at the remote computer, for accepting a user selection of the link to the established session; and means, responsive to said means for accepting user selection of the link to the established session, for providing a user interface to the session associated with the selected link.

44. A system according to claim 43, wherein said means for providing a user interface comprises means for displaying an input/output screen for the session associated with the selected link at the remote computer.

45. A system according to claim 41, further comprising:

means for terminating the session between the remote computer and the application; and wherein said means for maintaining a Session Vector comprises means, responsive to said means for terminating the session, for removing an identifier for the terminated session from the Session Vector.

46. A system according to claim 45, wherein said means for maintaining a link comprises means, responsive to said means for removing an identifier, for removing the link to the terminated session from the Web page.

47. A computer program product for managing a session between a remote computer and an application resident at a host computer, the computer program product comprising:

a computer-readable program storage medium having a computer-readable program code means embodied therein, the computer-readable program code means comprising:

computer-readable program code means for maintaining a Session Vector which is configured to identify sessions between the remote computer and the application; and computer-readable program code means, responsive to said computer-readable program code means for maintaining a Session Vector, for maintaining a link to a session identified in the Session Vector in a Web page accessible to the remote computer.

48. A computer program product according to claim 47, wherein said computer-readable program code means for maintaining a Session Vector comprises computer-readable program code means for instantiating a Session Vector Object which is configured to maintain the Session Vector.

49. A computer program product according to claim 48, wherein said computer-readable program code means comprises a Java applet including said computer-readable program code means for maintaining a Session Vector and said computer readable program code means for maintaining a link to a session.

50. A computer program product according to claim 48, wherein said computer-readable program code means for maintaining a Session Vector comprises computer-readable program code means for maintaining a Session Vector configured to maintain identifiers for sessions, further comprising computer-readable program code means for establishing a session between the remote computer and the application, and wherein said computer-readable program code means for maintaining a Session Vector comprises computer-readable program code means for adding an identifier for the established session to the Session Vector.

51. A computer program product according to claim 50, further comprising computer-readable program code means for accepting a user request to establish a session at the remote computer, and wherein said computer-readable program code means for establishing comprises computer-readable program code means for establishing a session in response to the accepted user request.

52. A computer program product according to claim 51, wherein said computer-readable program code means for maintaining a Session Vector comprises computer-readable program code means for determining if a session limit has been achieved, and further comprising computer-readable program code means, responsive to said computer-readable program code means for determining if a session limit has been achieved, for preventing establishment of a session if the session limit has been achieved.

53. A computer program product according to claim 50, wherein said computer-readable program code means for maintaining a link comprises computer-readable program code means for creating a link to the established session in the Web page.

54. A computer program product according to claim 53, wherein said computer-readable program code means for maintaining a link comprises computer-readable program code means for updating the Web page in response to addition of the identifier to the Session Vector.

55. A computer program product according to claim 50, further comprising:

computer readable program code means, responsive to a user at the remote computer, for accepting a user selection of the link to the established session; and computer-readable program code means, responsive to said means for accepting user selection of the link to the established session, for providing a user interface to the session associated with the selected link.

56. A computer program product according to claim 55, wherein said computer-readable program code means for providing a user interface comprises computer-readable program code means for displaying an input/output screen for the session associated with the selected link at the remote computer.

57. A computer program product according to claim 50, further comprising:

computer-readable program code means for terminating the session between the remote computer and the application; and wherein said computer-readable program code means for maintaining a Session Vector comprises computer-readable program code means, responsive to said computer-readable program code means for terminating the session, for removing an identifier for the terminated session from the Session Vector.

58. A system according to claim 57, wherein said computer-readable program code means for maintaining a link comprises computer-readable program code means, responsive to said means for removing an identifier, for removing the link to the terminated session.

59. A computer program product for managing a session between a remote computer and an application resident at a host computer, the computer program product comprising:

a computer-readable program storage medium having a computer-readable information embodied therein configured to provide a Web page at a Web browser accessing the computer-readable information, the Web page including a link object embedded therein which provides access to a session between the remote computer and the application, wherein the session between the remote computer and the application is identified by a Session Vector.

60. A computer program product according to claim 59, wherein said computer-readable information is configured to provide a user-selectable field in a display of the Web page, the selection of which activates the embedded link object to provide access the session.

* * * * *